No. 618,325. Patented Jan. 24, 1899.
G. M. BOTT.
CONVERTIBLE TRUCK.
(Application filed Oct. 3, 1898.)
(No Model.)
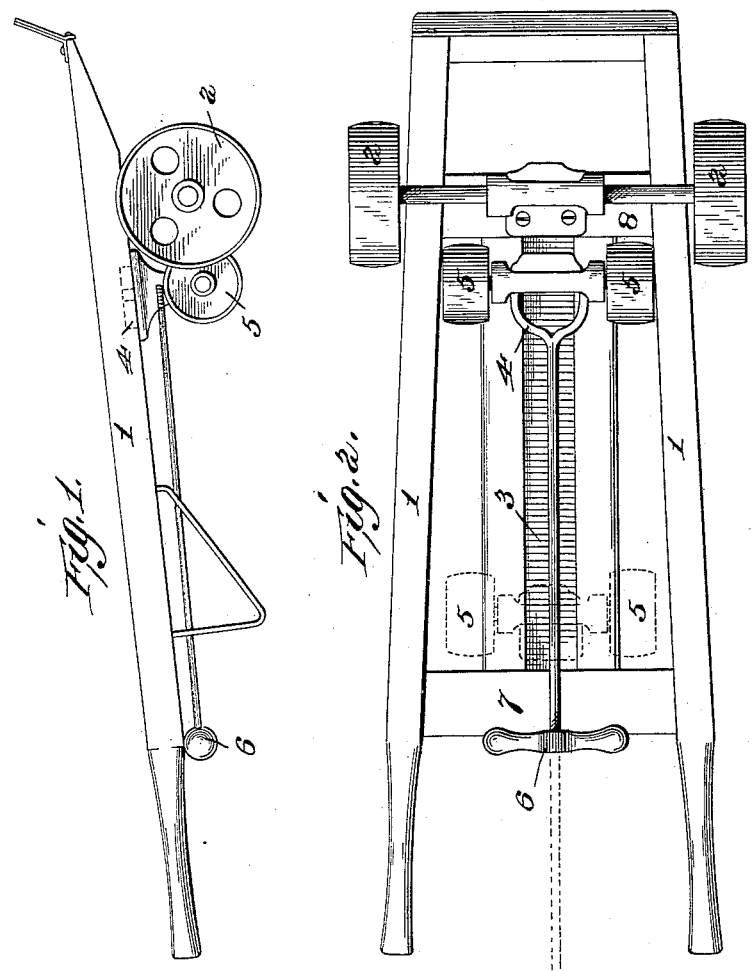

UNITED STATES PATENT OFFICE.

GEORGE M. BOTT, OF ASHLAND, OHIO, ASSIGNOR OF ONE-HALF TO F. R. MARKS, OF SAME PLACE.

CONVERTIBLE TRUCK.

SPECIFICATION forming part of Letters Patent No. 618,325, dated January 24, 1899.

Application filed October 3, 1898. Serial No. 692,533. (No model.)

*To all whom it may concern:*

Be it known that I, GEORGE M. BOTT, a citizen of the United States, residing at Ashland, county of Ashland, and State of Ohio, have invented certain new and useful Improvements in Convertible Trucks, of which the following is a specification.

My invention relates to convertible trucks such as are used by draymen and the like.

The object thereof is to provide a truck that may be readily changed from four to two wheels in which the wheels thrown out of use may be so disposed that they will add such little weight to the truck that its efficiency will not be reduced.

To this end the invention includes an ordinary two-wheel truck carrying a pair of extra wheels having a shiftable connection with the body of the truck, so that they may be easily moved into and thrown out of use.

It also includes the details of construction, as will be hereinafter described, and particularly pointed out in the claims.

The invention is illustrated in the accompanying drawings, in which—

Figure 1 is a side elevation of the truck provided with my improvements. Fig. 2 is a bottom plan view of the same. Figs. 3 and 4 are detail views of a modification.

The truck 1 shown herein is provided near its forward end with a pair of supporting-wheels 2, and in the under face of its body portion a grooveway 3 is formed. This way is adapted to receive the block 4, which carries a pair of wheels 5, from which a handle 6 extends rearwardly. The way 3 extends the full length of the body, being closed at each end by cross-pieces 7 8, extending between the sides of the truck.

To use the truck as a four-wheel carrier, the block 4 is drawn by the handle to the forward end of the way, where it is arrested by the cross-piece 7. The truck is then drawn along by the handle 6, the wheels 5 being the front wheels of the set supporting the body. When only two wheels are desired to support the truck, the block 4 is shifted to the opposite end of the way, where it is arrested by the cross-piece 8. This will bring the wheels 5 substantially in the same vertical plane as the wheel 2, and their entire weight is then at the fulcrum-point of the truck.

It will be noted that the wheels 5 are of less diameter than the wheels 2, so that they will not come in contact with the ground when placed in their inoperative position, and are suitably swiveled to the block 4.

In Figs. 3 and 4 a single wheel 5' is shown, forming the auxiliary wheel-support, said wheel being swiveled to a block guided in the way in the truck-bottom.

I claim—

1. A truck having a pair of permanent wheels secured near one end thereof, and a wheeled support shiftable longitudinally of the truck to bring the same at the opposite end of the truck or to bring said support in proximity to the permanent wheels so that their weight will be at the fulcrum-point of the truck, substantially as described.

2. A truck having side bars and a body portion permanent wheels secured to said truck, and an auxiliary wheel-support slidably secured to said body portion adapted to be shifted longitudinally thereof, substantially as described.

3. A truck having a pair of permanent wheels, and a pair of auxiliary wheels slidably secured to the truck of less diameter than said permanent wheels, adapted to be shifted longitudinally thereof substantially as described.

4. A truck-body having a pair of wheels permanently secured near one end thereof, said body having a longitudinal guiding-way, a block sliding in said way and a pair of wheels and a handle carried by said block, substantially as described.

5. A truck-body having a pair of wheels permanently secured thereto near one end thereof, said truck having a way therein extending longitudinally thereof from a point above said wheels, a sliding block guided in said way, a pair of wheels and a handle carried thereby and a stop for said block closing the forward end of said way, substantially as described.

6. The combination with a truck having a pair of permanently-attached wheels, of auxiliary wheeled support swiveled to the body of said truck by a sliding pivot, substantially as described.

In testimony whereof I affix my signature in presence of two witnesses.

GEORGE M. BOTT.

Witnesses:
 GEO. W. RYALL,
 J. T. REASER.